United States Patent [19]

Temple et al.

[11] Patent Number: 4,550,472

[45] Date of Patent: Nov. 5, 1985

[54] APPARATUS FOR AND METHOD OF SHIRRING A TUBULAR CASING

[75] Inventors: Stephen Temple; Nigel J. Jones; Alan N. Syrop, all of Cambridge, England

[73] Assignee: Devro, Inc., Somerville, N.J.

[21] Appl. No.: 714,772

[22] Filed: Mar. 22, 1985

[30] Foreign Application Priority Data

Mar. 30, 1984 [GB] United Kingdom ............... 8408329

[51] Int. Cl.$^4$ ........................................... A22C 13/02
[52] U.S. Cl. ............................................ 17/1 R; 17/41; 17/42; 53/576; 53/581
[58] Field of Search ............ 17/1 R, 41, 42, 49; 53/576, 581, 397; 493/302, 407, 419, 464, 940

[56] References Cited

U.S. PATENT DOCUMENTS

| | | | |
|---|---|---|---|
| 3,337,906 | 8/1967 | Kaluza | 17/42 |
| 3,938,220 | 2/1976 | Sheridan et al. | 17/42 |
| 4,176,204 | 11/1979 | Winkler | 17/42 |
| 4,210,981 | 7/1980 | Story | 17/41 |
| 4,358,873 | 11/1982 | Kollross | 17/41 |

Primary Examiner—John Sipos
Assistant Examiner—Donald R. Studebaker

[57] ABSTRACT

An apparatus for shirring a tubular casing in which the compression of the shirred stick is produced by employing a tapered mandrel positioned between shirring wheels. The taper is carefully chosen to produce uniform shirring and compression.

In the drawing (FIG. 3) is shown part of a shirring machine comprising a pair of shirring wheels 21.22 located on opposite sides of a mandrel 15. The mandrel 15 has a tapered section 27 which begins immediately upstream of the line 27B joining the centers 21A, 22A of the shirring wheels and continues a substantial distance downstream of the line 27B. Back pressure is generated by rolls 28, 29.

A preferred rate of taper is about 1 in 5 but the rate of taper may be anywhere in the range 1 in 4 to 1 in 30.

13 Claims, 4 Drawing Figures

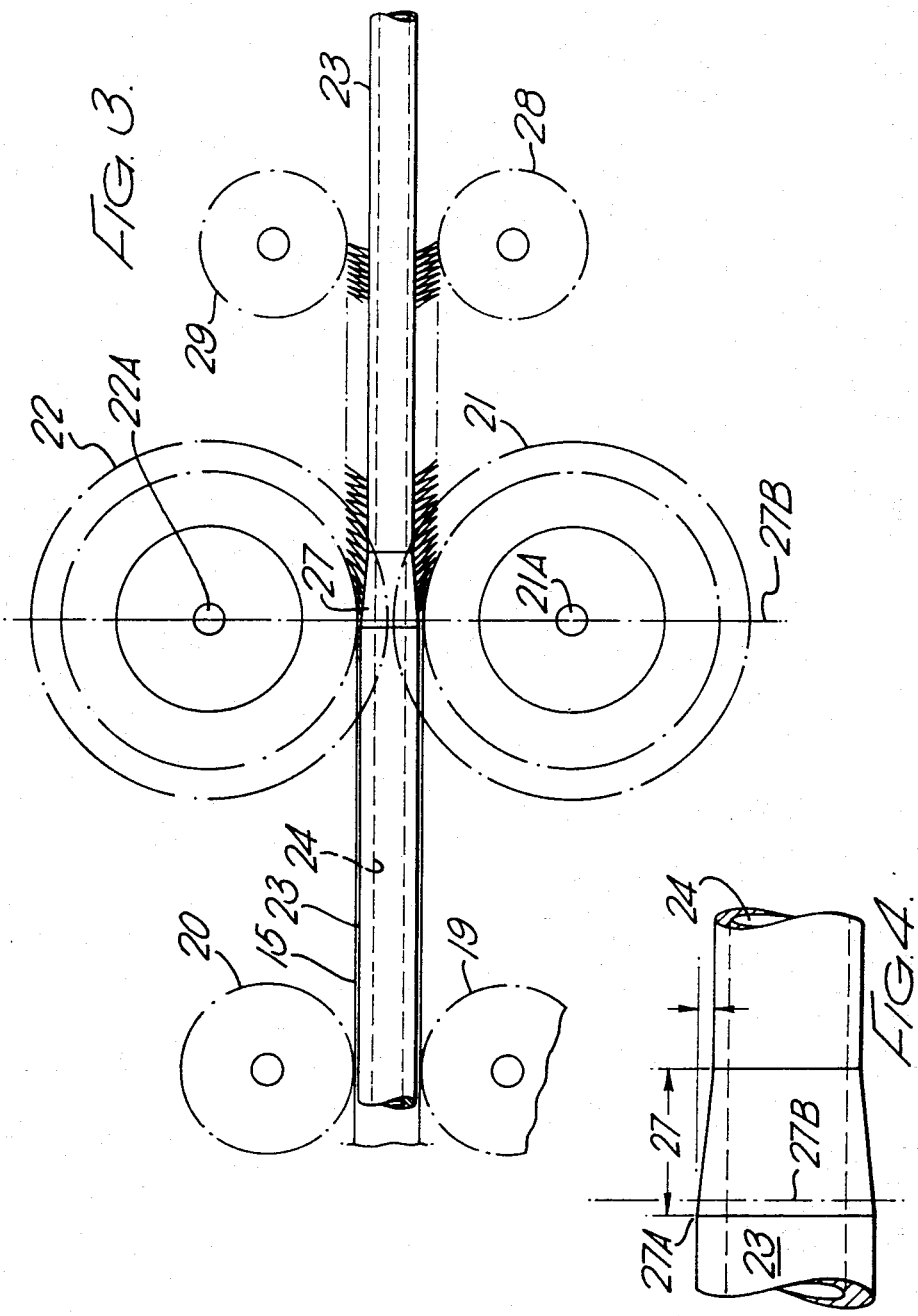

APPARATUS FOR AND METHOD OF SHIRRING A TUBULAR CASING

This invention relates to an apparatus for and a method of shirring a tubular casing such as a collagen-based casing or a regenerated cellulosic casing of the kind employed in the manufacture of sausages.

It is known to pass a pressurised tubular casing along a mandrel of uniform diameter lying between shirring paddles, rolls, or bands. It is also known to compress or compact the shirred casing, known as a stick or a slug, after the shirring has been effected, by an additional compressing mechanism.

It is an object of this invention to provide an apparatus and a method which enables the compression or compaction to take place during the shirring and provide a controlled compression.

According to one aspect of the invention, there is an apparatus for shirring a tubular casing comprising a mandrel along which an inflated casing is arranged to be fed the mandrel comprising a cylindrical section followed, in the direction in which the casing is to be fed, by a section which tapers from the diameter of the cylindrical section to a smaller diameter, the tapered section being located in the area in which shirring takes place.

Preferably the smaller diameter is substantially equal to the required internal diameter of the slug of shirred tubular casing to be produced by the apparatus.

There are preferably a single pair of cooperating shirring paddles, rolls or bands, the mandrel extending between the pair of paddles or rolls and the tapered portion of the mandrel extending from a point adjacent, but in advance of, a line joining the centres of the pair of paddles or rolls, to a point substantially downstream of that line.

At least the tapered section of the mandrel is preferably made from glass-reinforced PTFE. Alternatively a stainless steel tapered section may be employed. The taper is preferably uniform. A preferred range of taper rate is from 1 in 4 to 1 in 30. A taper rate of 1 in 4 means that there is a change in diameter of 1 mm for every 4 mm length of the mandrel. It may, for example be such as to produce a 1 mm change in diameter for every 10 mm length of the mandrel. An optimum taper is 1 in 5.

Preferably the final compacting of the slug is produced in a single process using the tapered mandrel without use of subsequent compression.

From another aspect the invention comprises a method of manufacturing a slug of shirred tubular material, comprising feeding an inflated casing along a mandrel lying between shirring paddles or rollers and permitting the shirred slug to expand inwardly along a tapered portion of the mandrel during shirring so as to compact and compress the slug to its final dimensions. The paddles or rolls are preferably of the kind described in our copending U.S. patent application Ser. No. 714670.

In the formation of a shirred casing it is preferable to provide shirring paddles rolls or bands which produce a helical primary fold with secondary folds lying between the helical primary folds.

When a casing is shirred the resultant compact shirred casing, known as a stick, may contain a considerable length e.g. 24 meters of casing in a relatively short length of "stick", e.g. 23 cm. The ratio between the original length of the casing and the length of the shirred stick is defined as the compression ratio, the length of the shirred stick being measured between the peaks of the first and last of the primary folds.

A more accurate way of indicating the amount of casing which is included in a given shirred stick, taking account of the thickness of the material of which the casing is made, is to define in terms of "packing efficiency". The packing efficiency is the ratio of the volume of a casing when laid flat (before shirring) divided by the effective volume of the annular slug or stick, expressed as a percentage. It is calculated by the following formula:

$$\frac{\text{Length of unshirred casing} \times 2 \times \text{wall thickness} \times \text{width of laid flat casing} \times 100}{\text{Stick or slug length} \times \frac{PI}{4} \times (\text{outside diameter of stick}^2 - \text{bore of stick}^2)}$$

(Width of laid flat casing is known as "lay-flat").

The thickness of the material is preferably measured by use of an Elcometer thickness monitor.

By use of the tapered mandrel of the present invention it is possible to produce sticks having increased compression ratios compared with those produced by other machines. This is because the tapered mandrel causes primary folds or pleats formed during shirring to slide over adjacent primary folds and to lock in a controlled manner. In accordance with the present invention a shirred stick has a compression ratio in the range 95 to 140. This is achieved without reduction of the bore or detriment to the run-out properties of the shirred stick. "Run-out" is the deshirring of the stick, during filling, in a sausage making process.

Also in accordance with the invention it is possible to produce a shirred stick having an increased packing efficiency, the packing efficiency being in the range 45 to 90%.

The advantage of the increase in compression ratio and packing efficiency is that more rigid shirred sticks, despite increased internal diameters, can be produced.

The taper also controls the compression, controls slippage, and enables a correct, predetermined, internal diameter to be achieved.

The taper of the mandrel thus has two primary effects. Firstly it makes the operation of the machine and the formation of the shirr stick stable despite a limited range of variation of the properties of the incoming material. Secondly it improves the compression ratio and packing efficiency of the shirr as compared with shirring on a constant diameter mandrel.

If the folds are made to slip the density of the shirred slug, or stick, will be improved but if this is done after the formation of the shirr, as is done in the prior art, the slip does not necessarily occur axisymmetrically. By allowing the internal diameter of the shirred slug to slide gently and uniformly down a taper, during shirr formation, a regular nesting of the primary folds is obtained, thus giving a high compression ratio, better packing efficiency, and a straighter (more axisymmetric) stick.

The taper angle is important. If the taper angle is reduced too much (i.e. made too shallow or too flat) control is lost during the compression and the folds are not packed adequately. If the taper angle is made too steep jumping and instability results.

It is also believed to be important to relate the taper angle to the co-efficient friction of the material of which the mandrel is made. If mandrel material such as PTFE is employed which has a low co-efficient of friction, then it is possible to operate with a taper rate steeper than 1 in 20. Thus it is preferable to use PTFE rather than stainless steel which has a higher frictional co-efficient.

In the accompanying drawings;

FIG. 3 is a enlarged diagrammatic plan of a portion of the machine illustrating the tapered mandrel used in the present invention; and FIG. 4 is an enlarged portion of the tapered mandrel shown in FIG. 3.

Figure 1:
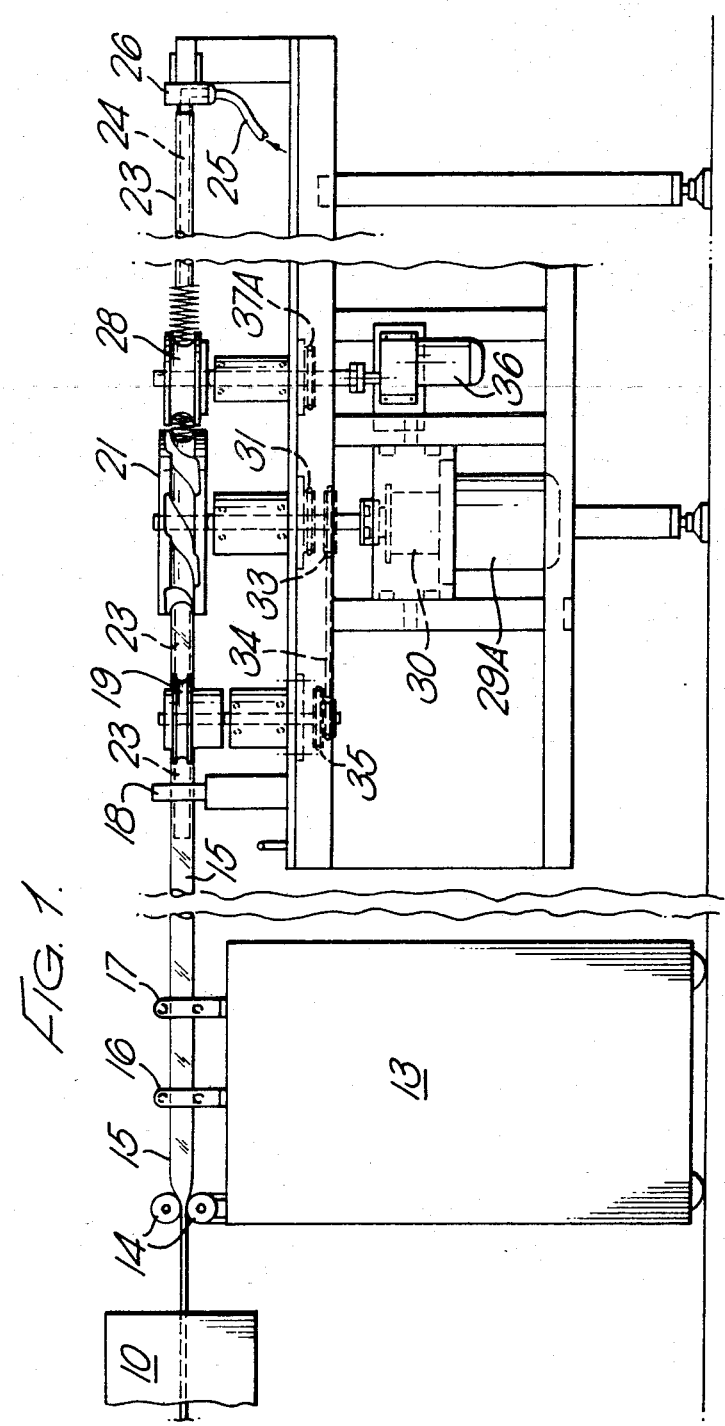
FIG. 1 is a side elevation showing portions of a shirring machine embodying the present invention.
Figure 2:
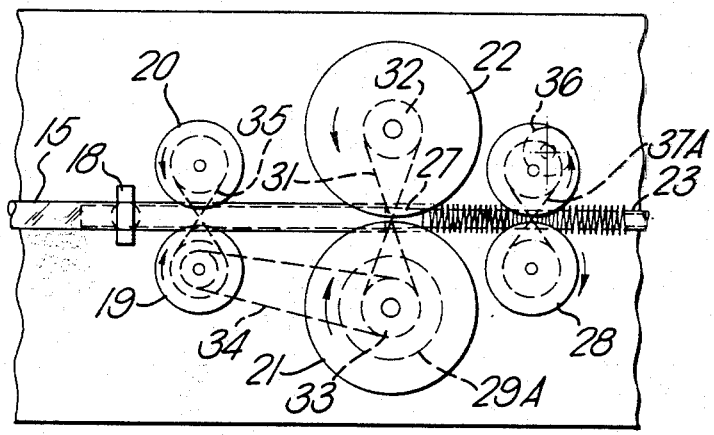
FIG. 2 is a plan of the central part only of the machine illustrated in FIG. 1.

The shirring machine shown in FIGS. 1 and 2 is diagrammatically represented and includes only those parts of the machine which are essential to an understanding of the invention.

As seen in FIG. 1, on the left of the machine is a drier 10 from which prepared collagen or cellulose is led through guide rollers 14, which grip the casing fairly tightly so that air which is put in the casing from the far end will not pass beyond rollers 14. The inflated casing is shown at 15 and is seen to pass through pairs of rolls 16 and 17 and through a guidance block 18 to a pair of drive rolls 19,20. The casing then enters the nip between the pair of shirring wheels 21,22. The casing as it passes through the drive rolls 19,20 and shirring wheels 21,22 passes over a mandrel 23. The mandrel has an internal passage 24 through which air is supplied under pressure from a source not shown via pipe 25 and mandrel end fitting 26. The air flowing through pipe 25 and bore 24 enters the casing and keeps it expanded as shown in FIG. 1. The shirring wheels 21 and 22 shirr the casing and the shirring takes place along a tapered portion 27 of the mandrel 23, which will be described in more detail later. The shirred casing is compressed because the casing passes through compression rolls 28,29 which are rotated at about 100th of the speed of the drive rolls 19 and 20, and in the same direction of rotation as the drive rolls 19 and 20. The shirring rolls rotate in the same direction as the drive rolls but at about twice the speed of the drive rolls. The range of speeds within which they may rotate according to the physical characteristics of the casing is from about 1.5 to 2.5 times the speed of the drive rolls. It will be seen that the outside edges of the wheels are almost touching, the spacing between them being of the order of 1 to 2 mm.

The compression of the casing takes place entirely during the formation of the shirr and as the shirred stick or slug compresses between the shirring wheels and the compression rolls.

The shirred stick emerges from the compression rolls and when a suitable length has been formed can be cut off, slid along the mandrel 23 and off the end of the mandrel after removal of the end fitting 26, the air being cut-off temporarily while this occurs.

The shirring wheels 21,22 are driven by a shirring wheel motor 29A which, through a gear-box 30 drives shirring wheel 21. Shirring wheel 22 is driven at the same speed by means of a belt drive 31 and pulleys 32,33.

An important aspect of this invention is that the compression of the shirred stick takes place in a single operation between the shirring wheels 21,22 and the compression rolls 28,29, the compression, and the folding of the shirred stick, being controlled by the taper 27 on the mandrel 23 (see particularly FIGS. 3 and 4). The mandrel is tapered so that there is a 1 mm change in diameter for every 5 mm length of the mandrel.

The drive rolls 19 and 20 are also driven through a system of pulley wheels and belts 34,35. The back-up or compression rolls 28,29 are driven by a separate electric motor 36 via belts 37 and 37A.

The shirring wheels 21 and 22 are molded or otherwise formed from rubber, such as synthetic rubber or natural rubber, or polyurethane.

The tapered portion 27 of the mandrel is shown in detail in FIG. 4 and it will be seen that the beginning of the taper at 27A occurs just in advance of the line 27B which joins the centres 21A and 22A of the respective shirring wheels 21 and 22.

The taper 27 extends in the direction of the arrow A, which will be called the downstream direction, and it will be noted that much of the greater proportion of the tapered part of the mandrel is downstream of the line 27B. The rate of taper is chosen in this instance to be about 1 to 5 i.e. there is 4 mm reduction in diameter for every 20 mm length of the mandrel.

It will be noted that the mandrel is used in this instance between a pair of shirring wheels of the kind described in our copending application Ser. No. 714670.

The mandrel may equally well be used with its tapered formation when multiple wheels or bands are used to produce the shirr e.g. three or more wheels or bands may be used.

The two wheel machine shown in the drawings does not require any additional compression after the compression rolls 21 and 22. In other words the full compression of the shirr occurs during formation of the shirr and any compaction necessary is effected by the tapered mandrel in combination with the back pressure generated by the compression rolls 28 and 29.

The tapered mandrel enables one to cater for minor changes in the properties of the tube such as diameter changes and material changes and produces a more uniformly shirred stick or slug despite such minor changes. The stick or slug is of more uniform diameter, is straighter and is more compact than sticks produced in the prior art.

With the aid of this tapered mandrel it is possible to produce sticks with a compression ratio (defined as the ratio of casing length to shirred length after compression) higher than has been produced in the past.

A shirring apparatus to with which the present invention may be advantageously employed is described and illustrated in our copending U.S. patent application Ser. No. 714670.

We claim:

1. An apparatus for shirring a tubular casing comprising a mandrel along which an inflated casing is arranged to be fed, the mandrel comprising a cylindrical section having a uniform diameter followed, in the direction in which the casing is to be fed, by a section which tapers in the direction of casing feeding from the uniform diameter of the cylindrical section to a smaller diameter, shirring means mounted at said tapered section for shirring said casing over said tapered section to reduce the inner diameter of the shirred casing to less than the uniform diameter of said cylindrical section.

2. Apparatus according to claim 1 and in which said smaller diameter is substantially equal to the required internal diameter of the slug of shirred tubular casing to be produced by the apparatus.

3. Apparatus according to claim 1 comprising a single pair of cooperating shirring wheels, said mandrel extending between the pair of wheels and the tapered portion of the mandrel extending from a point adjacent, but in advance of, a line joining the centres of the pair of paddles or rolls, to a point substantially downstream of that line.

4. Apparatus according to claim 1 in which at least the tapered section of the mandrel is made from glass-reinforced PTFE.

5. Apparatus according to claim 1 in which the tapered section of the mandrel is of stainless steel.

6. Apparatus according to claim 1 and in which the taper is uniform.

7. Apparatus according to claim 6 and in which the taper rate is from 1 in 4 to 1 in 30.

8. Apparatus according to claim 1 and in which final compacting of the shirred tubular casing or slug is produced in a single process using the tapered mandrel without use of subsequent compression.

9. A method of manufacturing a slug of shirred tubular material, comprising feeding an inflated casing along a mandrel having a section of uniform diameter, a tapered section tapered in the direction of the material feeding and a reduced diameter section, with said tapered section lying between shirring paddles or rollers, shirring said tubular material by said shirring means over said tapered section to reduce the inner diameter of the shirred casing to less than the uniform diameter.

10. A method according to claim 9 and in which, during the formation of the shirred casing, shirring wheels produce a helical primary fold with secondary folds lying between the helical primary folds.

11. A shirred stick or slug produced by the method of claim 9 which has a compression ratio in the range 45 to 90%.

12. A shirred stick or slug produced by the method of claim 9 which has a packing efficiency in the range 45 to 90%.

13. Apparatus for shirring a tubular casing comprising a mandrel along which the casing is fed and a pair of cooperating toothed shirring wheels located one on each side of the mandrel so that the teeth of the shirring wheels are in close proximity to and surround the mandrel, the mandrel comprising at least three sections, a section of uniform diameter, followed in the direction which the casing is fed by a section of reduced diameter and having a tapered section joining the section tapering in the direction of the movement of the casing of uniform diameter to the section of reduced diameter, wherein said shirring wheels shirr said casing over the tapered section extending from a position adjacent but in advance of a line joining the centres of said shirring wheels to a point substantially downstream of that line.

* * * * *